United States Patent
Solka

(10) Patent No.: US 6,817,963 B1
(45) Date of Patent: Nov. 16, 2004

(54) AUTOMOTIVE GEARBOX WITH AN INTEGRATED BRAKE

(75) Inventor: Ulrich Solka, Fürstenzell (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 99 days.

(21) Appl. No.: 09/403,423

(22) PCT Filed: Apr. 25, 1998

(86) PCT No.: PCT/EP98/02469

§ 371 (c)(1),
(2), (4) Date: Oct. 20, 1999

(87) PCT Pub. No.: WO98/50714

PCT Pub. Date: Nov. 12, 1998

(30) Foreign Application Priority Data

May 2, 1997  (DE) .......................................... 197 18 744

(51) Int. Cl.$^7$ ........................... F16H 3/44; F16H 57/08; B60K 17/04; F01M 1/00

(52) U.S. Cl. ........................ 475/323; 475/331; 180/372; 184/6.12

(58) Field of Search ................................ 475/331, 323, 475/328, 326, 327, 286; 180/372; 184/6.12, 43

(56) References Cited

U.S. PATENT DOCUMENTS

| | | | |
|---|---|---|---|
| 2,776,583 A | | 1/1957 | Williams ...................... 74/701 |
| 2,998,735 A | * | 9/1961 | Elfes ...................... 475/331 X |
| 3,115,204 A | | 12/1963 | Dence .......................... 180/10 |
| 4,159,657 A | * | 7/1979 | Stilley .......................... 74/801 |
| 4,181,042 A | | 1/1980 | Rau et al. ................. 74/750 R |
| 4,655,326 A | | 4/1987 | Osenbaugh ............... 188/18 A |
| 4,950,213 A | * | 8/1990 | Morisawa .............. 184/6.12 X |
| 5,024,636 A | | 6/1991 | Phebus et al. .............. 475/141 |
| 5,064,530 A | * | 11/1991 | Duff et al. ...................... 210/94 |
| 5,391,122 A | * | 2/1995 | Forster ................... 475/331 X |
| 5,391,123 A | | 2/1995 | Forster ......................... 475/83 |
| 5,397,281 A | | 3/1995 | Forster ......................... 475/83 |
| 5,509,864 A | * | 4/1996 | Hauser ................... 475/331 X |
| 5,645,148 A | * | 7/1997 | Saurin et al. ........... 475/331 X |
| 5,746,675 A | * | 5/1998 | Sugiyama ............... 475/331 X |
| 6,090,006 A | | 7/2000 | Kingston ..................... 475/323 |

FOREIGN PATENT DOCUMENTS

| | | | |
|---|---|---|---|
| DE | 23 28 929 | 12/1973 | |
| DE | 23 57 451 | 5/1975 | |
| DE | 29 07 138 C2 | 9/1979 | |
| DE | 38 32 649 A1 | 7/1989 | |
| DE | 38 36 457 A1 | 5/1990 | |
| DE | 39 05 292 A1 | 8/1990 | |
| DE | 40 11 022 A1 | 10/1990 | |
| DE | 42 06 087 A1 | 9/1993 | .......... B60K/17/14 |
| DE | 43 00 445 A1 | 7/1994 | |
| DE | 195 23 543 A1 | 1/1997 | |
| DE | 196 40 146 C1 | 1/1998 | |
| EP | 0 722 051 A2 | 7/1996 | |
| FR | 2 641 232 | 7/1990 | |
| GB | 2 043 186 A | 10/1980 | |
| GB | 2 089 741 A | 6/1982 | |
| GB | 2 220 178 A | 1/1990 | .......... B60K/17/04 |

\* cited by examiner

*Primary Examiner*—Roger Pang

(57) ABSTRACT

The invention relates to an automotive transmission (1) designed in the form of a planetary transmission with an integrated brake, preferably for final drive mechanisms of working machines such as wheel loaders or industrial trucks. A sun gear (2) drives a planet carrier (5, 105) via at least one planetary gear (3), which rolls on a fixed internal-geared wheel (4, 104). The planet carrier (5, 105) holds the inner brake plates (6) of a multi-disc plate in an outer radial area. The outer brake plates (6) and the wheel support are accommodated by a component (16) of the housing (12). The planet carrier (5, 105) is axially braced on a radially outwards pointing journal (7) via a central accessible screw (9) with an output range (8) and transmits output torque to the flange via teeth.

19 Claims, 2 Drawing Sheets

US 6,817,963 B1

AUTOMOTIVE GEARBOX WITH AN INTEGRATED BRAKE

BACKGROUND OF THE INVENTION

The invention relates to an automotive transmission with an integrated brake. Such transmissions can be used in final drive mechanisms of working machines of every kind, such as wheel loaders or lift trucks, wheeled or tracked vehicles. German Patent DE 907 138 has disclosed a planetary transmission as final drive mechanism in a wheel head. In the driving axle described in this patent a multi-disc brake is, of course, superimposed on an axle bridge housing. The construction demands much space in axial and in radial directions and is formed of many separate parts.

The problem on which the invention is based is to provide an automotive transmission which does not require much space in axial and radial directions and is composed of few parts and to integrate a brake therein. It should preferably make optimum use of the interior of a wheel rim.

SUMMARY OF THE INVENTION

The automotive transmission is a planetary transmission having a sun gear as input, at least one planetary gear and a fixed internal-geared wheel. The planetary gear or planetary gears are supported on a planet carrier which as output drives an output flange for supporting a gear. In this transmission is integrated a multi-disc brake designed as liquid-cooled multi-plate brake. The planet carrier at the same time holds on its radially outer area the inner brake discs which rotate at the speed of the gear.

In an advantageous development of the invention, the planet carrier or a connecting part containing the planet carrier has a journal pointing in direction of the gear. The journal preferably passes over the torque to the output flange via engaging gears. The output flange advantageously houses a rim. It preferably carries a seal which seals the housing of the automotive transmission. The output flange is advantageously passed into a support that forms the gear support. The planet carrier is thus indirectly supported on its journal by the output flange. The length of the journal indicates approximately the width of the bearing base. The output flange is preferably braced by one central screw or several screws accessible from outside, optionally via a counter support or directly axially, with the planet carrier or the journal thereof. The advantage of this construction is that after releasing the bolt connection the output flange is easily outwardly removable. As added advantage, the bearing play in this bolt connection is adjusted. The separate assembly expense of adjustment of the bearing can be eliminated.

In an advantageous development of the invention, the automotive transmission is accommodated in a wheel head. The internal-geared wheel is preferably supported in a hub carrier. In a technological variation of this, the internal-geared wheel forms an annular flange through which the torque is introduced in the axle bridge bearing. The wheel head is preferably attached to a funnel-shaped extension of an axle bridge housing preferably via a large pitch circle. Acting upon the internal-geared wheel, the torque can be reinforced by the fastening of the internal-geared wheel on bosses of the funnel-shaped extension of the axle bridge housing. Alternatively to this, the torque, acting upon the internal geared wheel, can be absorbed by the wheel head which, in turn, is fastened on the axle bridge housing. In one other technological variation, the internal-geared wheel forms an annular flange which is fastened between wheel head and axle bridge housing.

The functions "lodging of gear support" and "lodging of the outer brake discs" are preferably combined in one part.

An annular piston, acting as brake piston, is preferably situated concentrically relative to the gear support.

In another advantageous development of the invention, several single pistons are disposed paraxially around the gear support.

In an advantageous development of the invention, when the brake is eroded, the brake piston or brake pistons can be readjusted, preferably by a front-side bolt. The feed lines of the brake piston or brake pistons are advantageously placed on the outer diameter of a hub carrier. The erosion of the brake discs over a brake piston back can be measured by a locking screw from outside or via a radial bore in a hub carrier or from the side of an axle bridge. The brake piston or brake pistons are advantageously reset by means of springs. The reset springs are preferably mounted between the last of the outer brake discs on the piston side on bosses on the radial outer edge of the brake discs. The reset springs support themselves on the other end on a non-rotatable part of the wheel head.

BRIEF DESCRIPTION OF THE DRAWINGS

Embodiments of the invention are shown in the drawings where.

DESCRIPTION OF THE PREFERRED EMBODIMENTS

Figure 1:
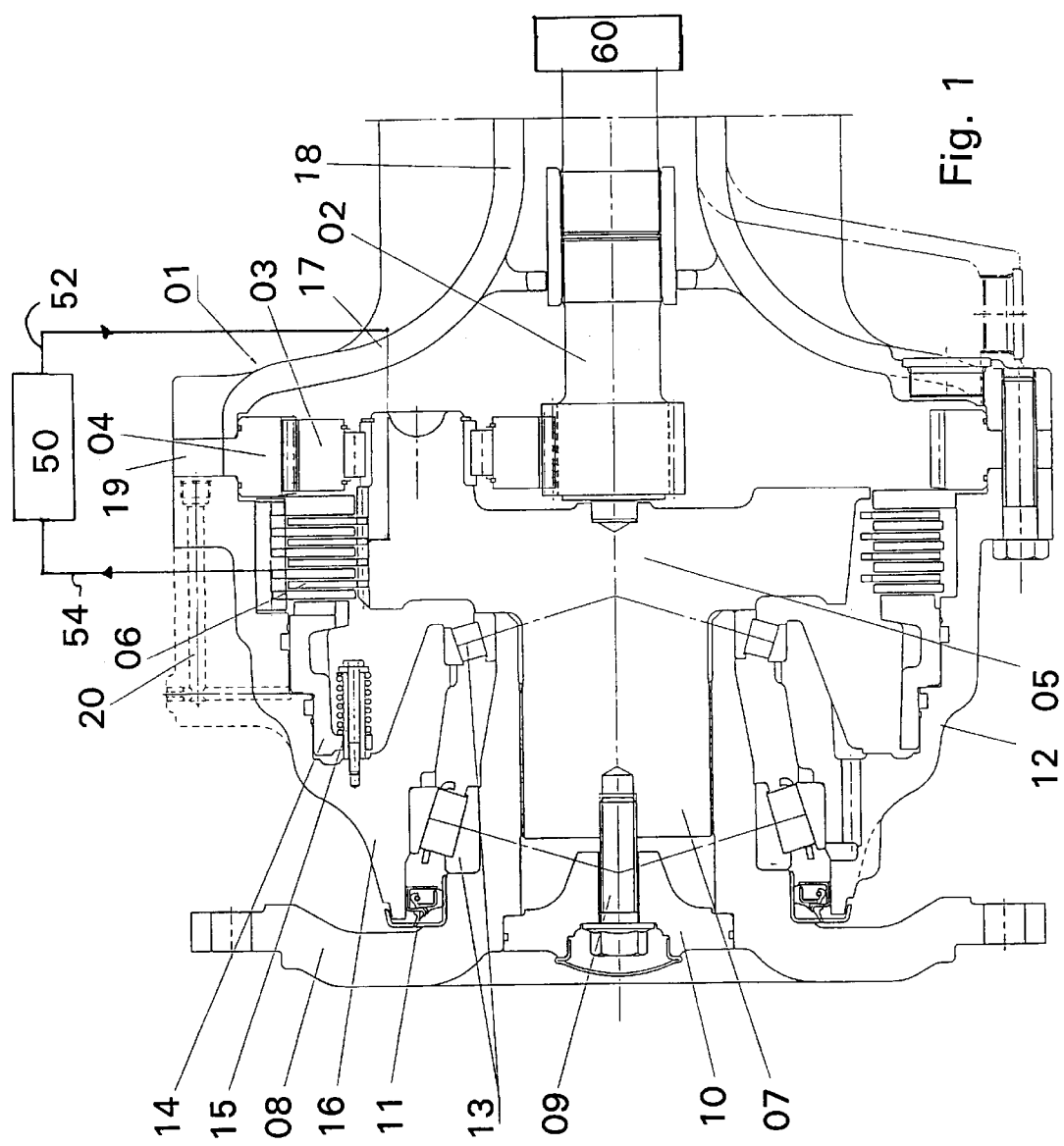
FIG. 1 is an automotive transmission designed as planetary transmission in a final output mechanism.

FIG. 1 shows an automotive transmission 1 designed as planetary transmission in a final output mechanism. One sun gear 2 drives a planet carrier 5, via at least one planetary gear 3, rolling on a fixed internal-geared wheel 4. The planetary carrier holds on its radial outer area the inner brake discs 6 of a liquid-cooled multi-plate brake. The planet carrier 5 has a journal 7 pointing axially outwards, i.e. in direction of the gear, which transmits the output torque to the output flange 8 via engaging gears. The output flange is braced by a central bolt 9 accessible from the outside, via a counter support 10, axially with the planet carrier 5 on the journal 7 thereof. The output flange 8 accommodates a rim (not shown). It carries a seal 11 which seals the housing 12 of the automotive transmission 1. It is passed into a support 13 forming the gear support. The bolt 9 braces the output flange 8 with the planet carrier 5. An annular piston 14 disposed concentrically relative to the central axle of the automotive transmission 1 acts as brake piston on the brake discs 6. It is reset by springs 15. The housing 12 of the automotive transmission 1 is subdivided in a manner such that one part 16 accommodates the gear support and the outer fixed brake discs 6. The housing 12 of the automotive transmission 1 is attached, via a large pitch circle, to a funnel-shaped extension 17 of an axle bridge housing 18. At the same time, the internal-geared wheel 4 is designed as annular flange 19 which is situated between the housing 12 of the automotive transmission 1 and the axle bridge housing 18 and together with the housing 12 of the automotive transmission 1 is screwed on the axle bridge housing 18. The feed line 20 of the brake piston is disposed on the outer diameter of the housing 12 acting as hub carrier.

Figure 2:
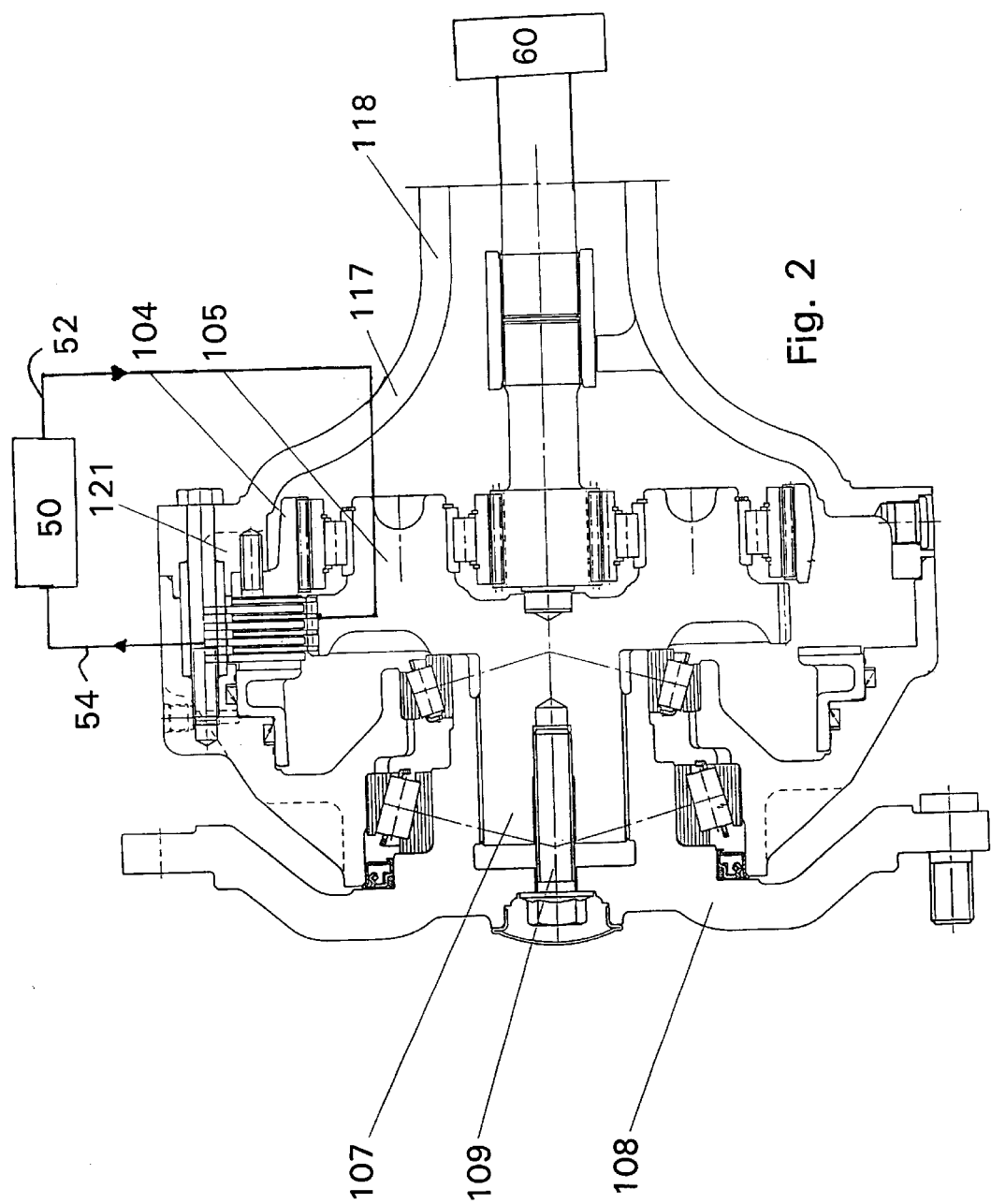
FIG. 2 is a technological variation of the above.

FIG. 2 shows a technological variation of this automotive transmission 1 designed as planetary transmission in a terminal output mechanism. The output flange 108 is directly braced axially with the planet carrier 105 on the journal 107 thereof by a central bolt 109 accessible from the outside. In this technological variation, the internal-geared wheel 104 is fastened directly on bosses 121 of the axle bridge housing 118. At the same time, the torque, acting upon the annulus gear 104, is reinforced, via bushing press fits, which are plugged in bores of the internal-geared wheel 104 and of the bosses 121 of the axle bridge housing 118.

In an advantageous development of the invention, a coolant circulation system is designed for cooling the brake discs. Through bores and/or grooves and/or beads 52 on the outer diameter of the planet carrier 5 on the side of the brake discs 6, coolant 50 arrives at the brake discs 6. From the centrifugal acceleration a stimulating effect results. The brake discs 6 are advantageously penetrated by grooves (not shown) through which the coolant 50 can flow even when the discs 6 are adjacent. Ducts and/or recesses 54 in the outer discs, in the internal-geared wheel 4 and/or a hub carrier, make the outflow of the coolant 50 possible. The grooves in the inner brake discs preferably extend radially in a first approach. Thereby the coolant 50 undergoes one other centrifugal acceleration. The coolant 50 is here flung on the radial outer edge of the disc set. The ducts or recesses 54 in the outer brake discs 6 for reflux of the coolant 50 preferably extend axially. In the technological variation in which the internal-geared wheel 4 is fastened on bosses 121 of a funnel-shaped extension 117 of the axle bridge housing 118, the coolant 50 in the peripheral area can flow among the bosses 121 between the radially outer edge of the internal-geared wheel 4 and the axle bridge housing 118. By means of a funnel-shaped plate the short circuit of inflowing and outflowing coolant 50 of the coolant circulation system is preferably prevented in the proximity of the planet carrier.

In one other alternative development of the invention, the automotive transmission is accommodated in an axle bridge housing 118 adjacent a differential transmission 60.

What is claimed is:

1. An automotive transmission comprising:
    a transmission housing supporting a sun gear (2) providing a driving input to at least one planetary gear (3) rotating about a fixed annulus gear (4, 104) and driving a planetary carrier (5, 105), and the planetary carrier (5, 105) providing a driving output to an output flange (8, 108);
    the planetary carrier (5, 105) is drivingly connected to the output flange (8, 108); and
    a liquid-cooled multi-disc brake having a plurality of inner brake discs mounted on a radial outer diameter of said planetary carrier for rotation therewith and a plurality of outer brake discs nonrotatably fixed within the transmission (1);
    wherein the transmission further has a coolant circulation system which delivers a coolant, to said brake discs, by an inflow formed in said planet carrier (5, 105) adjacent the inner brake discs (6) and the coolant is centrifugally accelerated outwardly through at least one of grooves, ducts and recesses in at least one of said inner brake discs (6) and said outer brake discs, towards an outflow adjacent said outer brake discs.

2. The automotive transmission (1) according to claim 1, wherein a journal (7, 107) connected to the carrier is connected to and transmits a driving torque to said output flange (8, 108) via an engaging connection.

3. The automotive transmission (1) according to claim 1, wherein said output flange (8, 108) includes a gear support providing radial engagement with a journal connected to the planet carrier and a bearing support (13) facilitating relative rotation of the output flange with respect to the housing, the output flange further having a rim carrying a seal (11) for rotatably sealably engaging said housing (12) of said automotive transmission (1).

4. The automotive transmission (1) according to claim 1, wherein said output flange (8, 108) is axially secured to a journal (7, 107) connected to said planet carrier (5, 105) by at least one bolt (9, 109) accessible from outside the transmission, the bolt securing the output flange to the journal by one of directly connecting the output flange and connecting the output flange via a counter support to the journal.

5. The automotive transmission (1) according to claim 1, wherein the transmission housing further comprises a wheel head having a hub carrier supporting the fixed annulus gear (4, 104) via an annular flange (19) through which a torque, developed by the driving input, is absorbed by an axle bridge/housing (18).

6. The automotive transmission (1) according to claim 1, wherein portions of the transmission housing (16) form a gear support, secure the outer fixed brake discs (6) and support said fixed annulus gear (4, 104).

7. The automotive transmission (1) according to claim 1, wherein the coolant of said coolant circulation system is received by the outflow formed in the housing part (16) supporting the outer brake discs (6) adjacent bosses supporting said fixed annulus gear (4, 104) on a funnel-shaped extension (117) of an axle bridge housing (118).

8. The automotive transmission (1) according to claim 1, further comprising a funnel-shaped plate located proximate to said planet carrier (5, 105) to prevent a short circuit of inflowing and outflowing coolant of said coolant circulation system.

9. The automotive transmission (1) according to claim 1, wherein an annular brake piston (14) for actuating the liquid-cooled multi-disc brake is situated concentrically about the planetary carrier within the transmission housing.

10. The automotive transmission (1) according to claim 1, wherein a plurality of individual pistons for actuating the liquid-cooled multi-disc brake are situated concentrically about the planetary carrier within the transmission housing.

11. The automotive transmission (1) according to claim 9, wherein feed lines for supplying brake pressure fluid to said brake piston are disposed through an outer diameter of a hub carrier.

12. The automotive transmission (1) according to claim 1, wherein the automotive transmission is attached to an axle bridge housing (18) adjacent a differential transmission.

13. An automotive transmission comprising:
    a transmission housing supporting a sun gear (2) providing a driving input to at least one planetary gear (3) rotating about a fixed annulus gear (4, 104) and driving a planetary carrier (5, 105), and the planetary carrier (5, 105) providing a driving output to an output flange (8, 108);
    the planetary carrier (5, 105) is drivingly connected with the output flange (8, 108); and
    a liquid-cooled multi-disc brake having a plurality of inner brake discs mounted on a radial outer diameter of said planetary carrier for rotation therewith and a plurality of outer brake discs mounted on a housing part (16);
    wherein an annular brake piston (14) is situated, within the transmission housing concentrically about the planetary carrier, for actuating the liquid-cooled multi-disc brake, and when the inner and outer brake discs of the multi-disc brake become eroded, said brake piston is adjustable by a bolt on a front side of the multi-disc brake.

14. The automotive transmission (1) according to claim 13, wherein said brake piston is adjusted by the bolt operating a spring providing a biasing force to said brake piston.

15. The automotive transmission (1) according to claim 14, wherein said spring is supported on a boss of a non-rotatable transmission housing portion adjacent the brake piston.

16. The automotive transmission (1) according to claim 14, wherein the planetary carrier (5, 105) includes a journal (7, 107) formed integrally with the extending coaxially from the planetary carrier (5, 105) toward the output flange (8, 108), and the journal (7, 107), integral with the planetary carrier (5, 105), is drivingly connected to the output flange (8, 108).

17. An automotive transmission comprising:
a transmission housing supporting a sun gear (2) providing a driving input to at least one planetary gear (3) rotating about a fixed annulus gear (4, 104) and driving a planetary carrier (5, 105), and the planetary carrier (5, 105) providing a driving output to an output flange (8, 108);

the planetary carrier (5, 105) is drivingly connected with the output flange (8, 108); and a liquid-cooled multi-disc brake having a plurality of inner brake discs mounted on a radial outer diameter of said planetary carrier for rotation therewith and a plurality of outer brake discs mounted on a housing part (16), wherein the housing further comprises a wheel head which is attached to a funnel-shaped extension (17, 117) of an axle bridge housing (18, 118), via an enlargement of said funnel-shaped extension (17, 117), and a torque, developed by the driving input, acting upon said fixed annulus gear (4, 104) is absorbed by the wheel head, the fixed annulus gear (104) is held fast by on said funnel-shaped extensiion (117) of a said axle bridge housing (118) and said fixed annulus gear (4) forms an annular flange (19) which is fastened between the wheel head and said axle bridge housing (18).

18. An automotive transmission comprising:
a transmission housing supporting a sun gear (2) providing a driving input to at least one planetary gear (3) rotating about a fixed annulus gear (4, 104) and driving a planetary carrier (5, 105), and the planetary carrier (5, 105) providing a driving output to an output flange (8, 108);

the planetary carrier (5, 105) is drivingly connected with the output flange (8, 108); and a liquid-cooled multi-disc brake having a plurality of inner brake discs mounted on a radial outer diameter of said planetary carrier for rotation therewith and a plurality of outer brake discs mounted on a housing part (16);

wherein an annular brake piston (14) is situated, within the transmission housing concentrically about the planetary carrier, for actuating the liquid-cooled multi-disc brake, and erosion of said brake discs (6) over a brake piston back is measured by an erosion bolt accessible from outside the transmission housing and extending through the housing via a radial bore in one of a hub carrier and an axle bridge.

19. An automotive transmission comprising:
a transmission housing supporting a sun gear (2) providing a driving input to at least one planetary gear (3) rotating about a fixed annulus gear (4, 104) and driving a planetary carrier (5, 105), and the planetary carrier (5, 105) providing a driving output to an output flange (8, 108);

the planetary carrier (5, 105) including a journal (7, 107) extending coaxially from the planetary carrier (5, 105) toward the output flange (8, 108) and being drivingly connected with the output flange (8, 108), the planetary carrier (5, 105) and the journal (7, 107) being formed as a single unitary component, the output flange (8, 108) being disconnectable from the journal (7, 107) of the planetary carrier (5, 105), and at least one bolt (9, 109) secures said output flange (8, 108) to said journal (7, 107) of said planet carrier (5, 105);

a pair of bearings (13) directly couple the output flange(8, 108 ) to the housing (16) to facilitate rotation of the output flange(8, 108 ) with respect to the housing (16); and a liquid-cooled multi-disc brake having a plurality of inner brake discs mounted on a radial outer diameter of said planetary carrier for rotation therewith and a plurality of outer brake discs are mounted on a housing part (16).

* * * * *